Patented Jan. 11, 1944

2,338,948

UNITED STATES PATENT OFFICE 2,338,948

SOLVENT FOR CHLORINATED RUBBER

Paul Kümmel, Oranienburg, near Berlin, Germany; vested in the Alien Property Custodian No Drawing. Application June 14, 1939, Serial No. 279,151. In Germany June 14, 1938

1 Claim. (Cl. 260—735)

The present invention relates to solvents for polymerised synthetic substances, and more particularly for those of said substances containing chlorine such as there are chlorinated rubber and polymerised vinyl chloride. These substances are continuously increasing in importance; but it is difficult to prepare with such substances coats or films which are free of pores so that their quality of high resistance cannot generally be utilised.

The present invention renders it possible to prepare pore-free coatings with such substances. The substances are used in certain solvents which are also suitable for dissolving polymerised compounds free of chlorine, such as polystyrenes, alkyl cellulose or other cellulose ethers.

Contrary to the common aromatic and nitrogen-containing synthetic substances, the said aliphatic and arylaliphatic synthetic substances, but principally those containing chlorine, have a very low solubility in the customary solvents, and a particularly low solubility in the fairly volatile solvents preferably used in the lacquer or varnish industry. Whereas, for example, other synthetic substances can be dissolved easily, or fairly readily in commercial benzene, the synthetic substances here discussed cannot be dissolved in such manner, except to an extent which is quite insufficient for practical purposes.

It has now been found that among the aromatic solvents methylisopropylbenzene occupies an unusual position. This aromatic substance which is characterised by a relatively large aliphatic substituted part can dissolve synthetic substances here concerned in considerably larger quantities. Accordingly the present invention provides for a medium to difficultly volatile solvent for polymerised synthetic substances of the aliphatic or arylaliphatic series, particularly for the ones containing halogen, such as chlorinated rubber or polymerised polyvinylchloride. That solvent is a solvent mixture comprising methylisopropylbenzene. Although it dissolves in practice at a speed which is satisfactory only for polystyrenes, methylisopropylbenzene becomes generally useful when small quantities of aliphatic esters or ketones are added thereto. If this addition amounts to less than 10%, the solvent mixtures will not display any undesired phenomena of disintegration when they dry, since the speeds of evaporation of the components are in this case approximately equal. As esters and ketones the following, for example, have been shown to be useful component solvents, a certain superiority of the oxycarbonic acid esters over the remaining solvents being clearly recognisable: ethyl acetate, butyl lactate, butyl acetate, ethyl oxalate, ethyl glycol acetate, butyl propionate, methyl ethyl ketone, diamyl ketone, mixtures of glycolmonoacetate with a higher alcohol such as butanol or ethyl glycol. Even for the difficultly soluble chlorinated rubber an addition of 7.5% ethyl lactate is sufficient.

Esters and ketones are known to be good solvents for most synthetic substances and thus also for certain synthetic substances of the kind dealt with here. It must nevertheless be considered as surprising that, contrary to what is otherwise known, the addition of methylisopropylbenzene does not give rise to any precipitation of the dissolved substance from such solutions. It would normally be expected that this aromatic substance, like the common aromatic substances, would abstract the aliphatic solvent from the solution of synthetic substance and thus cause precipitation of the said synthetic substance. The unexpected effect appears to be due to the fact that this aromatic compound comprises extensive side chains which themselves condition the stability of the system. This must be correct as is shown by the fact that isopropylbenzene seems to have a similar favourable effect. It appears to be due to the same reason that during the drying of the varnish, i. e., the period of evaporation of the solvent, disintegration cannot normally be observed.

The hereindescribed solvent for the said polymerised substances is of only medium volatility and therefore of good use in the varnish industry. Above all, it is also cheap since methylisopropylbenzene is a waste product in the production of cellulose from wood and in the extraction of camphor. It should be emphasised that this solvent is especially suitable for polymerised substances containing halogen, particularly chlorinated rubber. The varnish formed, for example, from a base of chlorinated rubber, e. g. that known under the registered trade-mark "Tegofan," is not at all or only very little inclined to become stringy when spread or sprayed and it provides a pore-free coating or film. Even in case the customary solvents for varnishes, viz. commercial benzene or ester-benzene mixtures, are added, the undesired phenomenon does not appear. Such varnishes flow well and the gloss is outstanding. Almost the same effect is obtained with polymerised vinyl chloride, (for example that known under the registered trade-mark "Vinoflex N") or polymerised styrene (for example that known under the registered trade-mark "Ronilla L").

Such cheap and generally utilisable solvents did certainly not exist among the series of fairly or difficultly volatile solvents of the prior art.

The invention may be illustrated by the following examples, but it is to be understood that it is not restricted to the particular details disclosed therein.

*Example 1.*—92 parts by weight of methylisopropylbenzene are mixed with 8 parts by weight of ethyl lactate. This mixture is especially suitable for chlorinated rubber.

*Example 2.*—93 parts by weight of p-methylisopropylbenzene are mixed with 7 parts by weight of ethyl benzol propionate. This solvent is well suited for polymerised vinyl chloride and also for other polymerised resins.

*Example 3.*—90 parts by weight of methylisopropylbenzene are mixed with 10 parts by weight of diamyl ketone. Since methylisopropylbenzene is formed in cellulose manufacture and processes, such mixtures are quite cheap. This offsets cost of an addition of the more expensive ketone.

*Example 4.*—35 parts by weight of p-methylisopropylbenzene are mixed with 10 parts by weight of isopropylbenzene (or with 10 more parts of p-methylisopropylbenzene), 5 parts by weight butyl lactate, 25 parts by weight of benzene lacquer and 25 parts by weight of butyl acetate. This mixture appears to be especially economical, and is suitable for all purposes within the scope of the invention.

*Example 5.*—46 parts by weight of methylisopropylbenzene are mixed with 4 parts by weight of ethyl oxalate and 50 parts by weight of toluene. This makes a cheap solvent which is of substantially general usefulness for the objects mentioned.

Having now particularly described and ascertained the nature of my said invention and in what manner the same is to be performed, I declare that what I claim is:

A varnish comprising chlorinated rubber dissolved in a solvent consisting of approximately 92 parts by weight of methylisopropylbenzene and approximately 8 parts by weight of ethyl lactate.

PAUL KÜMMEL.